VIDEO-SIGNAL TONE-ADJUSTING NETWORK

Filed Sept. 28, 1951 2 Sheets-Sheet 1

INVENTOR.
JOHN A. BOYAJEAN
BY Laurence B. Dodds
ATTORNEY

INVENTOR.
JOHN A. BOYAJEAN
BY Laurence B. Dodds
ATTORNEY

United States Patent Office 2,777,058

Patented Jan. 8, 1957

2,777,058

VIDEO-SIGNAL TONE-ADJUSTING NETWORK

John A. Boyajean, Huntington, N. Y., assignor to Fairchild Camera and Instrument Corporation, a corporation of Delaware Application September 28, 1951, Serial No. 248,755

7 Claims. (Cl. 250—27)

Figure 1:
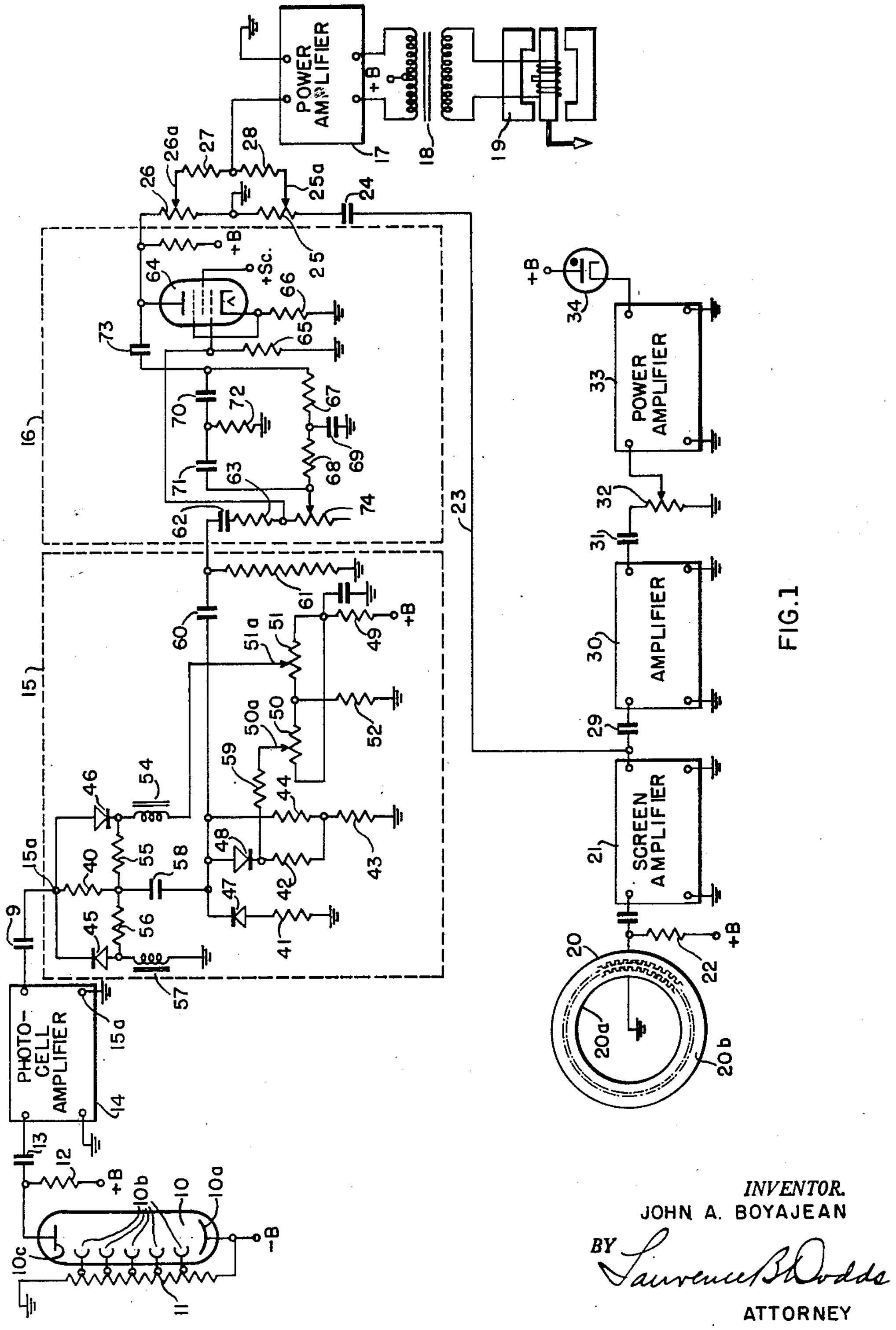

This invention relates to video-signal tone-adjusting networks and, while it is of general application, it is particularly suitable for embodiment in apparatus for producing screened relief pattern plates of the type described in applicant's copending application, Serial No. 40,594, filed July 24, 1948, entitled "Machine for Producing Screened Relief Pattern Plates," which issued as Patent No. 2,575,546 and subsequent Re. 23,914 and assigned to the same assignee as the present invention, and will be described herein in such an environment.

In the reproduction of visual images by television, photography, printing, etc., it is frequently desirable to introduce at some point in the video-signal translating channel a predetermined amplitude distortion, that is, a non-linear translation of the signal over a certain portion or portions of the signal amplitude range, in order to compensate for non-linear translations in other portions of the system, or in order to modify the overall signal-translating characteristic, or both, to obtain an apparent optimum fidelity of reproduction.

The desirability of such an amplitude distortion is due both to the usual inherent characteristics of the video-signal translating apparatus and the image-reproducing apparatus, as well as to certain well-known physiological phenomena of the observer. Thus, in image-reproducing apparatus of the type described in the aforesaid copending application, certain of the components may have non-linear translation or response characteristics, among which may be mentioned the reflection characteristics of the paper or the ink, or both; the plate-deforming characteristics of the engraving stylus or its actuating apparatus, or both; and the overprinting of highlight dots and the filling in of the deeper shadow areas due to the fact that the deposition of ink tends to be non-linear when the highlight dots are very small or the shadow deformations are very shallow.

Moreover, in some instances, if the illumination of the incremental areas of the reproduced image is proportional to the illumination of the corresponding areas of the original image, that is, if the system has a linear overall stimulus-response characteristic, the reproduced images may appear flat or distorted to an observer. In such cases, therefore, it is desirable to give the system a predetermined non-linear overall response characteristic. Such amplitude distortion of a video signal is termed tone compensation or gamma control. The gamma of a system is defined as the slope of the stimulus-response characteristic plotted on a logarithmic scale. When the response is linear, gamma is unity.

It is an object of the present invention, therefore, to provide a new and improved video-signal tone-adjusting network by means of which any desired tone compensation or gamma control of the reproduced image may be procured.

It is another object of the invention to provide a new and improved video-signal tone-adjusting network by means of which the above-described tonal distortions of a video-signal translating system may be readily compensated.

In accordance with the invention, in a video-signal translating system there is provided a tone-adjusting network comprising a video-signal translating channel, impedance means effectively in series with such channel, a first pair of opposed unidirectionally conductive devices connected effectively in parallel with the series impedance means, and a second pair of opposed unidirectionally conductive devices connected effectively in shunt to the channel. The network also includes means for applying to the conductive devices of the two pairs conduction-opposing biases of different values within the normal range of signal amplitudes, whereby the devices of such two pairs become conductive for different amplitudes of the translated video signal to impart a non-linear amplitude-response characteristic to the network.

For a better understanding of the present invention, together with other and further objects thereof, reference is had to the following description taken in connection with the accompanying drawings, while its scope will be pointed out in the appended claims.

Figure 3:
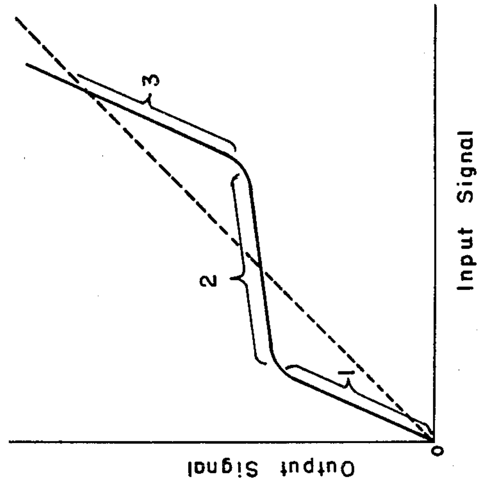
Figure 2:
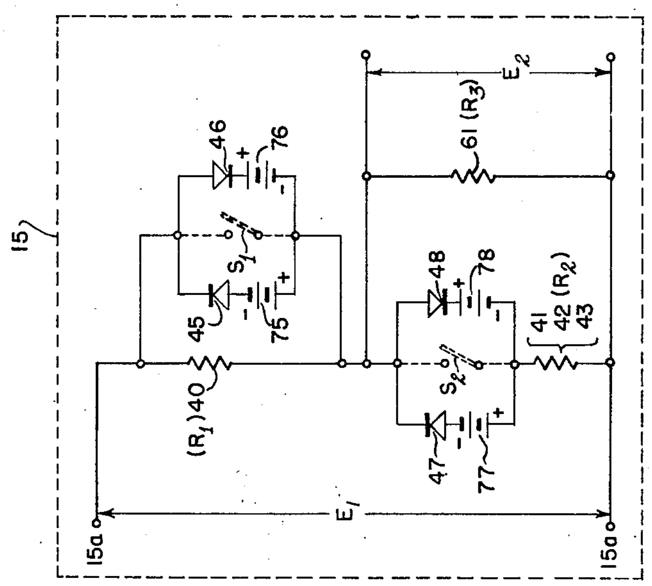

Referring now to the drawings, Fig. 1 is a circuit diagram, partly schematic, of a video-signal tone-adjusting network embodied in an apparatus for producing screened relief pattern plates of the type described in applicant's aforesaid copending application; Fig. 2 is a simplified circuit diagram to aid in the explanation of the operation of the apparatus; while Fig. 3 is a graph of an operating characteristic of the tone-adjusting network of Fig. 1.

Referring now more particularly to Fig. 1 of the drawings, there is represented an apparatus for producing screened relief pattern plates embodying a video-signal translating system including the tone-adjusting network of the invention. The translating system includes a pickup photocell 10 of the conventional electron multiplier type having a primary cathode **10*a* connected to a source —B and a plurality of multiplier cathodes 10*b* connected to electrically spaced points on a voltage-divider resistor 11 connected between ground and the unidirectional source —B. The anode 10*c* of the cell is connected to a suitable source +B through a load resistor 12, the signal across which is applied by way of a coupling condenser 13 to the input terminals of a photocell amplifier 14**, which may be of any suitable well-known type.

The output terminals of amplifier 14 are coupled through a coupling condenser 9 to a tone-adjusting network 15 embodying the invention and described in more detail hereinafter. The signal output of the tone-adjusting network 15 is applied to a wave-shaping circuit 16, also described hereinafter, for eliminating the distortion of the video-signal carrier wave by the tone-adjusting network. The output terminals of the wave-shaping network 16 are connected to an output or load resistor 26 of the voltage-divider type having an adjustable contact **26*a***.

The video-signal translating system also includes a periodic source or screen-frequency generator 20 of any suitable type, but preferably of the electrostatic type described in applicant's aforesaid copending application. As such, the generator 20 is connected as a variable condenser in the input circuit of a screen amplifier unit 21. Specifically, the rotor **20*a* of the generator 20 is connected to ground, while the stator 20*b* is connected to a suitable source of polarizing voltage +B through an isolating resistor 22. The signal output of the screen amplifier 21 is coupled by way of a conductor 23 and a coupling condenser 24 to a voltage divider 25 having an adjustable contact 25*a*. An adjustable portion of the screen-frequency signal applied to the voltage divider 25** is applied by way of contact 25a through an isolating resistor 28 and combined with the amplified photocell pickup signal derived from the voltage divider 26 through an isolating resistor 27 and applied to the power amplifier 17. The power amplifier 17 is coupled through an output transformer 18 to an engraving tool actuating apparatus 19 which may be of any suitable type, but preferably of the type described in applicant's copending application.

The amplified screen-frequency output from unit 21 is also applied through a coupling condenser 29 to an isolating amplifier 30 and thence through a coupling condenser 31 and a voltage divider 32 to a power amplifier 33. The output signal of the unit 33 is connected to energize a scanning light 34, preferably of the vapor electric type as described in applicant's aforesaid copending application.

Considering now the general operation of the video-signal translating system of Fig. 1 and neglecting for the present the tone-adjusting network 15 and the wave-shaping network 16, the pick-up photocell 10 is employed to scan an image to be reproduced. The image is illuminated by the scanning light 34, the illumination of which, as explained hereinafter, is modulated at screen frequency. The photocell 10 thereby develops a pulsating unidirectional signal of screen frequency which is modulated by the variations in intensity of illumination of the elemental areas of the image being scanned. This modulated pulsating signal is amplified in the unit 14 and impressed upon the tone-adjusting network 15, wherein its tonal characteristic or gamma is modified, and thence through the unit 16 in which the carrier component of the signal is restored to a sinusoidal wave form. The signal output from the unit 16 is mixed with the amplified screen-frequency output from the unit 21 in the resistance network 25, 26, 27, 28 and this combined signal is amplified in the unit 17 for energization of the engraving tool actuating apparatus 19. By properly adjusting the relative portions of the amplified video signal derived from the voltage divider 26 and of the amplified screen-frequency signal derived from the voltage divider 25, the character of the image plate formed by the unit 19 may be controlled within wide limits, as explained in applicant's aforesaid copending application.

The amplified screen-frequency signal output of the unit 21 is further amplified in the unit 30 and an adjustable portion thereof is selected by adjustment of the voltage divider 32 and applied to the power amplifier 33 wherein it is further amplified and used as a source of energizing potential for the scanner light 34. The adjustment of the circuit constants is such that substantially 100% modulation of the light output of the lamp 34 is effected, which facilitates the formation of a well defined screen pattern on the plate being engraved.

Referring now more particularly to the tone-adjusting network 15 included in the above-described video-signal translating system, as mentioned above, this unit is included in the main video-modulated carrier-signal translating channel of the system. The tone-adjusting network includes impedance means effectively in series with the video-signal translating channel, a non-linear conductive device connected effectively in parallel with such impedance means and a non-linear conductive device connected effectively in shunt to the channel, preferably in series with an impedance means which with the device are effectively in parallel with another impedance means effectively in shunt to the channel. Specifically, these impedance means comprise a resistor 40 effectively in series with the video-signal translating channel and a resistor 41 and series-connected resistors 42 and 43 effectively in parallel with resistor 41, and both effectively in shunt to the video-signal translating channel. The non-linear conductive devices of the network may be in the form of a pair of crystal rectifiers 45, 46 reversely connected in parallel with the resistor 40 and a pair of crystal rectifiers 47, 48 reversely connected in parallel and effectively connected in series with the resistor network comprising the resistors 41, 42, 43.

The tone-adjusting network 15 also includes means for applying conduction-opposing bias potentials of different values to the non-linear conductive devices or rectifiers, whereby the rectifiers 45, 46 become conductive for different amplitudes of the translated video-modulated carrier signal than the rectifiers 47, 48, thereby to impart to the network a non-linear amplitude-response characteristic. Specifically, these bias potentials are applied by means of a resistance voltage-divider network energized from a suitable source +B. This voltage-divider network includes a series isolating resistor 49 and a T network comprising series arms made up of voltage-divider resistors 50 and 51 and a shunt arm 52. The voltage divider 51 is provided with an adjustable contact 51a which is connected to dissimilar electrodes of the rectifiers 45, 46 through a choke 54, mid-point voltage-dividing resistors 55 and 56, and a second choke 57. The mid-point of resistors 55, 56 is connected to the common terminal of rectifiers 45, 46 through series resistor 40 and the potential drops across resistors 55 and 56 are of such magnitudes and polarities that equal and opposite biasing potentials are applied to rectifiers 45 and 46. The common junction of the resistors 40, 55, and 56 is connected by way of a coupling condenser 58 to the common connection of rectifiers 47, 48 as illustrated. The bias potential for the rectifiers 47, 48 is derived from the adjustable contact 50a of voltage divider 50 which is connected to a voltage divider comprising resistors 59, 42, and 43. The potential at the junction of resistors 42 and 43 is applied through a resistor 44 to the common terminal of rectifiers 47 and 48 and the potential drops across resistors 42 and 43 are of such magnitudes and polarities that equal and opposite biasing potentials are applied to rectifiers 47 and 48.

The video-signal translating channel also includes the wave-shaping circuit 16 coupled thereto for substantially eliminating wave-form distortion of the carrier signal due to the non-linear translating characteristic of the tone-adjusting network 15. Specifically, the signal output of the tone-adjusting network 15 is developed across a load network comprising a coupling condenser 60 and a load resistor 61 and is applied to the wave-shaping circuit 16 through a second coupling condenser 62 and resistor 63. The output signal is applied to the control grid of a vacuum-tube amplifier 64 which may be of the conventional pentode type. The tube 64 is provided with a grid leak 65 and a degenerative cathode resistor 66. The amplifier 64 is also provided with a degenerative feed-back connection comprising a bridged T-filter consisting of low-pass series-resistor arms 67 and 68 and a shunt condenser arm 69, in parallel with a high-pass network consisting of series-condenser arms 70 and 71 and a shunt resistor arm 72. The feed-back path is from the anode of the tube 64, through a coupling condenser 73, the filter networks just described, and a voltage-divider resistor 74 to the grid of the tube.

The operation of the tone-adjusting network 15 may be best explained by reference to the equivalent simplified circuit diagram of Fig. 2, in which equivalent circuit elements are given similar reference numerals. In this circuit the rectifiers 45 and 46 are biased by batteries 75, 76 of equal potential and opposite polarity. Similarly, rectifiers 47 and 48 are biased by batteries 77 and 78 of equal potential and opposite polarity. However, the potentials of the batteries of 75, 76 considerably exceed those of the batteries 77, 78. It will be understood that the batteries 75–78, inclusive, take the place of the voltage-divider network comprising the elements 49–57, inclusive, of Fig. 1.

When the video-modulated carrier signal applied to the terminals 15a, 15a of the unit 15 is of a very small amplitude, both pairs of diodes 45, 46 and 47, 48 are maintained non-conductive by their respective applied biasing potentials so that, in effect, they comprise open circuit switches $S_1$ and $S_2$, respectively, shown in dotted lines in Fig. 2. Under these conditions, the tone-adjusting network comprises merely the series resistor 40 ($R_1$) and the shunt load resistor 61 ($R_3$). Under these conditions, the attenuation of the tone-adjusting network is such that the input-output characteristic of the network is represented by the portion 1 of the graph of Fig. 3.

The relationship described continues until the amplitude of the video-modulated carrier signal reaches a value exceeding the bias potential applied to the diodes 47, 48, at which time they become conductive for the portions of each carrier cycle of an amplitude in excess of the bias potential and for such signal-amplitude portions the diodes 47 and 48 function effectively as a closed switch $S_2$, thereby placing the resistor network 41, 42, 43 ($R_2$) in shunt with the resistor 61 ($R_3$). The voltage-divider network comprising these resistors ($R_2$, $R_3$) and the resistor 40 ($R_1$) is thus modified to apply a reduced portion of the signal input to the signal output terminals and the tone-adjusting network has a repeating ratio represented by the portion 2 of the graph of Fig. 3.

Upon still further increase in the amplitude of the video-modulated signal carrier to values exceeding the bias potential applied to the rectifiers 45, 46, these rectifiers become conductive causing them to act effectively as a closed switch $S_1$, thereby short-circuiting the series resistor 40. This results in a repeating ratio of unity, that is, one in which the full signal input is applied to the output of the network, as represented by the portion 3 of the graph of Fig. 3, and this condition obtains for all further increases in amplitude of the video-modulated signal carrier.

Thus it will be seen that, by use of the tone-adjusting network 15, there is provided a controlled tonal characteristic or gamma control by which the low amplitude and high amplitude portions of the video-modulated carrier signal are relatively expanded, while the intermediate amplitude range corresponding to the portion 2 of the graph of Fig. 3 is considerably compressed. Such a characteristic would be useful, for example, in a system in which other components were effective to expand the intermediate portion of the amplitude range of the translated video signals.

It will be obvious to those skilled in the art that additional combinations of parallel and series resistor-diode-pair units similar to those specifically disclosed may be added to the tone-adjusting network to obtain additional steps or gradations in the attenuation characteristic of the network.

It can readily be shown that the repeating ratio of the output voltage $E_2$ with respect to the input voltage $E_1$ for each of the conditions described is as follows:

(1) Switches $S_1$ and $S_2$ open $$\text{Repeating ratio} = \frac{R_3}{R_1 + R_3}$$

(2) Switch $S_2$ closed, $S_1$ open $$\text{Repeating ratio} = \frac{R_2 R_3}{R_1(R_2 + R_3) + R_2 R_3}$$

(3) Switches $S_1$ and $S_2$ both closed $$\text{Repeating ratio} = 1$$

While the circuit parameters of the tone-adjusting network 15 may be given a wide range of values in accordance with the repeating ratio characteristic desired, by way of example there will be given below the circuit parameters of one tone-adjusting network constructed in accordance with the circuit diagram of Fig. 1:

| | | |
|---|---|---|
| Resistor **40** | kilohms | 47 |
| Resistor **41** | ohms | 1500 |
| Resistor **42** | do | 750 |
| Resistor **43** | do | 750 |
| Resistor **44** | kilohms | 120 |
| Resistors **50, 51** | do | 50 |
| Resistor **52** | do | 22 |
| Resistors **55, 56** | ohms | 4700 |
| Condensers **9, 58, 60** | microfarad | 1 |
| Crystals **45, 46, 47, 48** | Type 1N35, 1N54A, or 1N52 | |

The wave-shaping circuit 16 is substantially conventional in construction and operation. Effectively the time constants of the low-pass network 67, 68, 69 and the high-pass network 70, 71, 72 are effective to provide maximum degeneration at the screen frequency with the result that harmonic components comprising the distortion components of the video-modulated carrier applied thereto are substantially attenuated so that the output carrier signal thereof has a substantially sinusoidal wave form.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a video-signal translating system, a tone-adjusting network comprising: a video-signal translating channel; impedance means effectively in series with said channel; a first pair of opposed unidirectionally conductive devices connected effectively in parallel with said series impedance means; a second pair of opposed unidirectionally conductive devices connected effectively in shunt to said channel; and means for applying to the devices of said two pairs conduction-opposing biases of different values within the normal range of signal amplitudes, whereby the devices of said two pairs become conductive for different amplitudes of the translated video signal to impart a non-linear amplitude-response characteristic to said network.

2. In a video-signal translating system, a tone-adjusting network comprising: a video-signal translating channel; impedance means effectively in series with said channel; impedance means effectively in shunt to said channel; two pairs of opposed unidirectionally conductive devices individually connected effectively in parallel with said impedance means; and means for applying to the devices of said two pairs conduction-opposing biases of different values within the normal range of signal amplitudes, whereby the devices of said two pairs become conductive for different amplitudes of the translated video signal to impart a non-linear amplitude-response characteristic to said network.

3. In a video-signal translating system, a tone-adjusting network comprising: a video-signal translating channel; impedance means effectively in series with said channel; impedance means effectively in shunt to said channel; a first pair of opposed unidirectionally conductive devices connected effectively in parallel with said series impedance means; a second pair of opposed unidirectionally conductive devices connected effectively in series with said shunt impedance means; and means for applying to the devices of said two pairs conduction-opposing biases of different values within the normal range of signal amplitudes, whereby the devices of said two pairs become conductive for different amplitudes of the translated video signal to impart a non-linear amplitude-response characteristic to said network.

4. In a video-signal translating system, a tone-adjusting network comprising: a video-signal translating channel; a resistor effectively in series with said channel; a resistor effectively in shunt to said channel; a first pair of opposed unidirectionally conductive devices connected effectively in parallel with said series resistor; a series-connected second pair of opposed unidirectionally conductive devices and a resistor connected effectively in parallel with said shunt resistor; and means for applying to the devices of said two pairs conduction-opposing biases of different values within the normal range of signal amplitudes, whereby the devices of said two pairs become conductive for different amplitudes of the translated video signal to impart a non-linear amplitude-response characteristic to said network.

5. In a video-signal translating system, a tone-adjusting network comprising: a video-signal translating channel; impedance means effectively in series with said channel; a pair of opposed diode rectifiers connected effectively in parallel with said series impedance means; a pair of opposed diode rectifiers connected effectively in shunt with said channel; and means for applying to the rectifiers of said two pairs conduction-opposing biases of different values within the normal range of signal amplitudes, whereby said rectifiers become conductive for different amplitudes of the translated video signal to impart a non-linear amplitude-response characteristic to said network.

6. In a video-signal translating system, a tone-adjusting network comprising: a video-signal translating channel; a resistor effectively in series with said channel; a second resistor and a load resistor effectively in shunt to said channel; a first pair of opposed unidirectionally conductive devices connected effectively in parallel with said series resistor; a second pair of opposed unidirectionally conductive devices effectively connected in series with said second resistor; and means for applying to the devices of said two pairs conduction-opposing biases of different values within the normal range of signal amplitudes, whereby the devices of said two pairs become conductive for different amplitudes of the translated video signal to impart a non-linear amplitude-response characteristic to said network.

7. In a video-signal translating system, a tone-adjusting network comprising: a video-modulated carrier-signal translating channel; impedance means effectively in series with said channel; a first pair of opposed unidirectionally conductive devices connected effectively in parallel with said series impedance means; a second pair of opposed unidirectionally conductive devices connected effectively in shunt to said channel; means for applying to the devices of said two pairs conduction-opposing biases of different values within the normal range of signal amplitudes, whereby the devices of said two pairs become conductive for different amplitudes of the translated carrier signal to impart a non-linear amplitude-response characteristic to said network; and a wave-shaping circuit coupled to said channel for substantially eliminating wave-form distortion of said carrier signal due to said non-linear characteristic.

References Cited in the file of this patent

UNITED STATES PATENTS

| | | |
|---|---|---|
| 2,021,920 | Norwine | Nov. 26, 1935 |
| 2,098,370 | Bartels | Nov. 9, 1937 |
| 2,212,832 | Holzler | Aug. 27, 1940 |
| 2,342,238 | Barney | Feb. 22, 1944 |
| 2,453,958 | Andresen | Nov. 16, 1948 |
| 2,552,348 | Shapiro et al. | May 8, 1951 |
| 2,600,423 | Nolle | June 17, 1952 |
| 2,641,649 | Pierce | June 9, 1953 |

FOREIGN PATENTS

| | | |
|---|---|---|
| 418,811 | Great Britain | Oct. 31, 1934 |
| 475,446 | Great Britain | Nov. 19, 1937 |